(12) United States Patent
Simons et al.

(10) Patent No.: US 6,745,859 B2
(45) Date of Patent: Jun. 8, 2004

(54) POWERED WHEEL ASSEMBLY

(76) Inventors: Beverly Ann Simons, 13501 Scanlan Way, Davidson, NC (US) 28036; Roger Larry Simons, 13501 Scanlan Way, Davidson, NC (US) 28036

(*) Notice: Subject to any disclaimer, the term of this patent is extended or adjusted under 35 U.S.C. 154(b) by 97 days.

(21) Appl. No.: 10/136,588

(22) Filed: May 1, 2002

(65) Prior Publication Data

US 2003/0205417 A1 Nov. 6, 2003

(51) Int. Cl.[7] .................................................. B62D 51/04
(52) U.S. Cl. .................. 180/19.1; 180/65.1; 280/47.26; 280/653
(58) Field of Search .............................. 180/19.1–19.3, 180/65.1, 65.5–65.8; 280/47.26, 653

(56) References Cited

U.S. PATENT DOCUMENTS

| | | | |
|---|---|---|---|
| 3,791,470 A | * | 2/1974 | Baddorf et al. ............ 180/19.1 |
| 4,589,508 A | | 5/1986 | Hoover et al. |
| 5,211,254 A | | 5/1993 | Harris, III et al. |
| 5,305,843 A | * | 4/1994 | Armstrong ................. 180/19.1 |
| 5,350,030 A | | 9/1994 | Mawhinney et al. |
| D357,101 S | | 4/1995 | Uyehara et al. |
| 5,465,801 A | | 11/1995 | Hoover |
| 5,489,000 A | | 2/1996 | Hillbohm |
| 5,878,827 A | | 3/1999 | Fox |
| 6,173,799 B1 | * | 1/2001 | Miyazaki et al. .......... 180/19.3 |

* cited by examiner

Primary Examiner—Lesley D. Morris
Assistant Examiner—L. Lum
(74) Attorney, Agent, or Firm—Summa & Allan, P.A.

(57) ABSTRACT

A powered wheel assembly for use in connection with a wheelbarrow includes in one embodiment a frame that includes support members, a wheel assembly that includes a wheel, an axle, and axle housing, and a pin for connecting the axle and axle housing, and a drive assembly that includes a primary gear drive and a final chain drive. Upon retrofit to an existing wheelbarrow, the powered wheel assembly permits an operator to selectively operate the wheelbarrow in a powered and non-powered mode of transport.

45 Claims, 4 Drawing Sheets

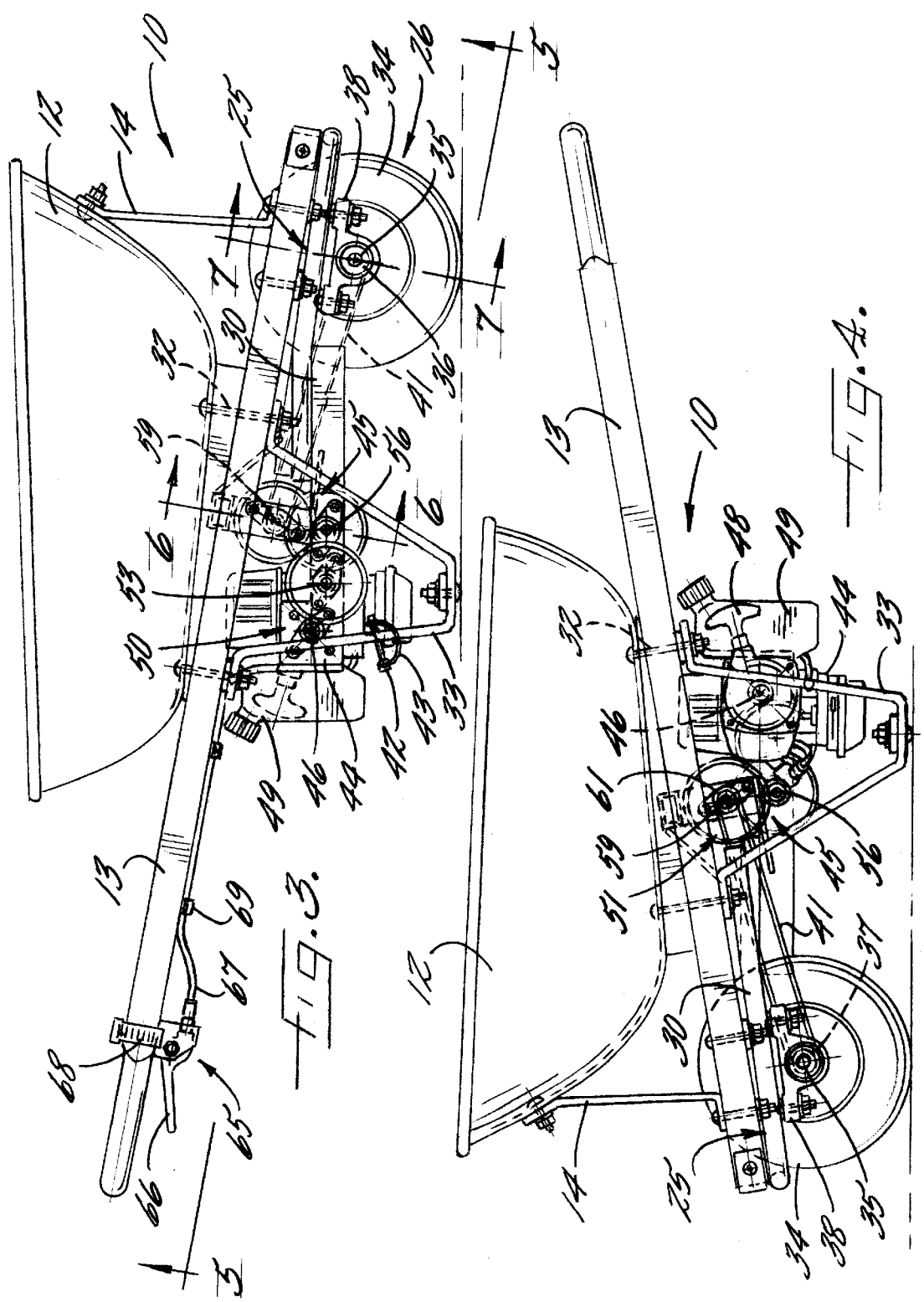

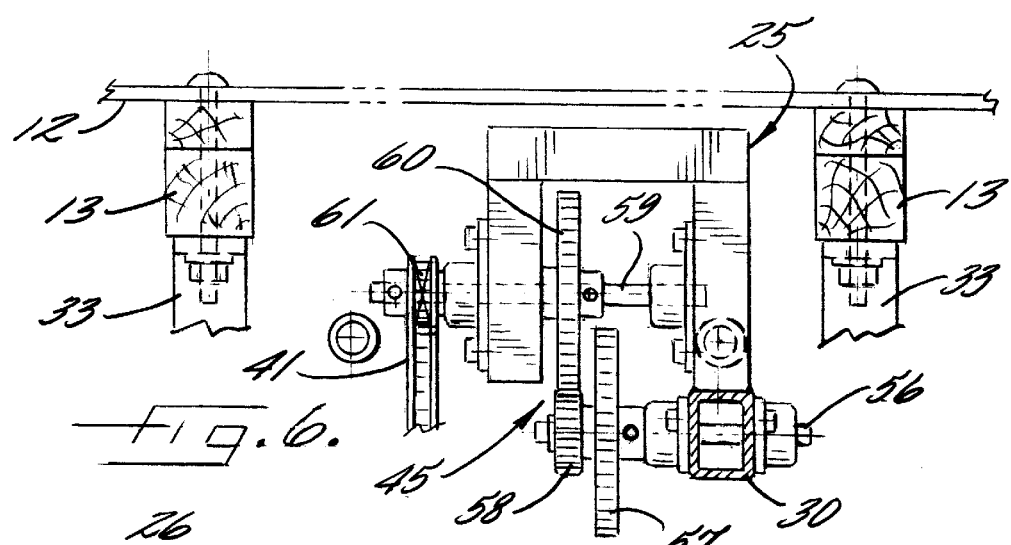
fig. 6.
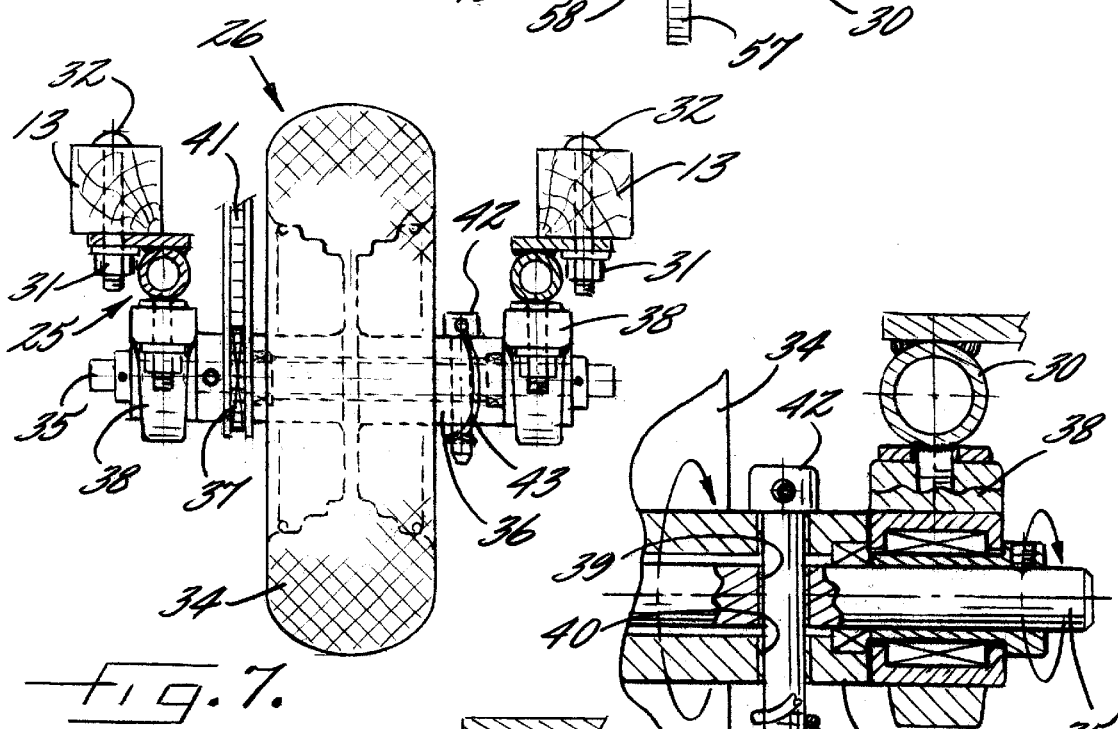
fig. 7.
fig. 8A.
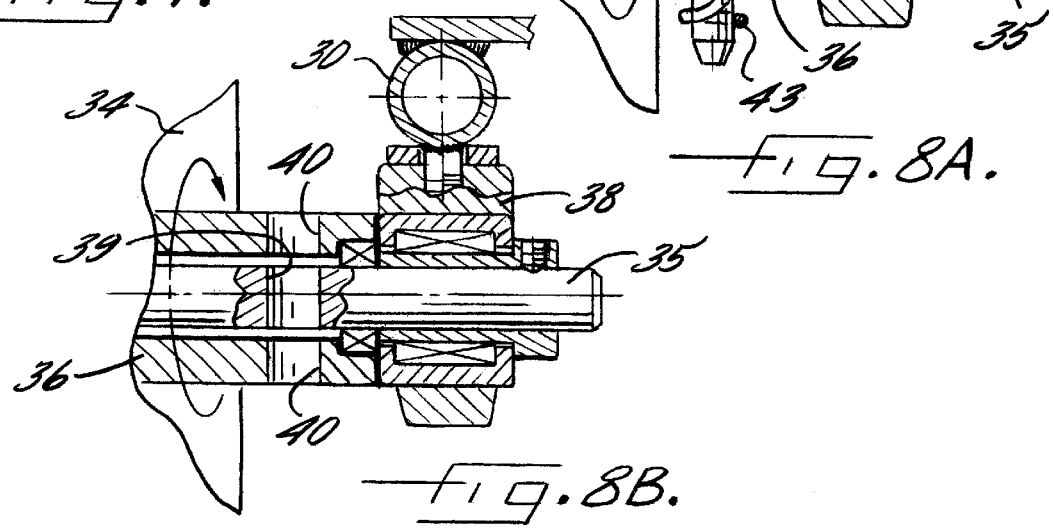
fig. 8B.

POWERED WHEEL ASSEMBLY

FIELD OF THE INVENTION

The invention relates to a powered wheel assembly for use in connection with a wheelbarrow. In particular, the invention relates to a powered wheel assembly capable of retrofit to an existing wheelbarrow that permits an operator to selectively operate the wheelbarrow in a powered and non-powered mode of transport.

BACKGROUND OF THE INVENTION

Operators have used wheelbarrows since at least as early as 230 A.D. for transporting articles ranging from dirt to various building materials. More recently, operators have secured engines to wheelbarrows to assist in the transport of heavy materials. Several existing motorized wheelbarrows provide operators with the ability to select varying gears and speeds. These wheelbarrows incorporate complicated clutch systems and gear drives that require frequent maintenance. Furthermore existing motorized wheelbarrows are typically sold as a complete unit that includes a frame, pan, handles, engine, and wheel assembly. Thus, a consumer must purchase an additional wheelbarrow when seeking a motorized alternative. Accordingly, the consumer faces the maintenance costs and storage problems associated with two wheelbarrows, one for powered transport and another for non-powered or manual transport. Moreover, the cost of the complete unit offered for sale is oftentimes prohibitively expensive. Thus, there is a need for a relatively inexpensive motorized wheel assembly that is capable of retrofit to an existing wheelbarrow.

Known motorized wheelbarrows that include an engine and drive train often provide a neutral gearing position wherein the drive train is not engaged with the wheel assembly (i.e., axel, drive sprocket, and wheel). The operator may use the neutral position while manually pushing the wheelbarrow when, for example, the engine runs out of gas or when transporting light loads. Nevertheless, the wheel assembly of the known devices remains operatively connected to the drive train and creates frictional forces that the operator must overcome when manually pushing the wheelbarrow. Accordingly, there is also a need for a motorized wheelbarrow that permits the operator to select between powered assistance for the transport of heavy materials (e.g., rocks) and non-powered assistance for the transport of lightweight articles (e.g., gardening tools and clippings). Specifically there is a need for a motorized wheelbarrow that includes a non-powered mode of transport wherein the wheel is free to rotate independent of the drive train and free from the frictional forces associated therewith.

Variations of motorized wheelbarrows exist to assist the consumer with routine tasks. For example, existing motorized wheelbarrows having a pivotable pan permit operators to easily unload (i.e., dump) the materials under transport. Nevertheless, the pivoting mechanism tends to fail and requires additional maintenance and expense.

U.S. Pat. No. 4,589,508 to Hoover et al. describes a motorized wheelbarrow capable of powered movement in a forward and reverse direction. More specifically, Hoover discloses a friction drive mechanism having a moveable friction wheel mounted on a swing arm and operated by a friction lever to promote forward and rearward travel. Hoover further discloses a pivotable bed. Nevertheless, Hoover fails to provide an assembly that can be easily retrofit on the type of wheelbarrow most commonly used by consumers. For example, Hoover requires structural modification of the wheelbarrow frame to include different kinds of vertical and horizontal supports for securing pans of varying shape to the frame. Further, Hoover fails to provide an apparatus that promotes ease of use. For example, Hoover employs a friction drive lever and throttle lever mounted on both handles of the wheelbarrow, thus requiring an operator to manipulate both handles during operation. Further, Hoover incorporates a hinge and lock mechanism for pivoting the bed. This type of mechanism promotes structural fatigue of the frame at the pivot points. Although the drive train of Hoover provides a neutral selection for manual movement of the wheelbarrow, the wheelbarrow encounters resistance from the drive train because the transmission remains operatively engaged with the wheel. Accordingly, friction caused by the drive train prevents free rotation of the wheel. In other words, the operator must push the wheelbarrow with enough force to overcome resistance inherent with the drive train. Accordingly, the structural modifications necessary for interchanging beds, the difficulty of use in operation, and the lack of a freely rotating wheel render the Hoover apparatus impractical for use during ordinary yard work. In addition, the frictional forces inherent with drive train-even while in neutral-require the user to exert excess force to move the wheelbarrow when, for example, it runs out of gas.

In comparison, the present invention does not require a friction drive lever for gradual drive engagement. Nor does the present invention require structural modification for retrofit on an existing wheelbarrow. Moreover, the freely rotating wheel of the present invention in the non-powered mode requires less force to move the wheelbarrow when pushed manually. The ease with which the present invention can be retrofit provides an economically viable option for consumers requiring a motorized wheelbarrow. Simply stated, the present invention is easier to install, maintain, and operate (i.e., no structural modification, minimal downtime to retrofit, and maintainability of the drive train).

SUMMARY OF THE INVENTION

It is therefore an object of the present invention to provide a powered wheel assembly that is capable of easy retrofit to an existing wheelbarrow.

Yet another object of the invention is the provision of a powered wheel assembly that permits the operator to select between powered assistance for the transport of heavy materials and manual operation for the transport of lightweight articles.

A further object of the invention is the provision of a motorized wheelbarrow that promotes a freely rotating wheel during manual operation of the wheelbarrow.

The invention meets these objectives with a powered wheel assembly that is capable of retrofit on an existing wheelbarrow and that permits an operator to selectively operate the wheelbarrow in a powered and non-powered mode of transport. In particular, the invention is a powered wheel assembly having a frame assembly that is attachable to an existing wheelbarrow, a wheel assembly secured to the frame, and a drive assembly that can selectively operate the wheel assembly to move the wheelbarrow under power.

The foregoing and other objects and advantages of the invention and the manner in which the same are accomplished will become clearer based on the following detailed description taken in conjunction with the accompanying drawings in which:

BRIEF DESCRIPTION OF THE DRAWINGS

FIG. 3 is a right side elevation view of the preferred embodiment of the powered wheel assembly retrofit to a standard wheelbarrow illustrating the drive gear, drive shaft, and series of gears of the drive assembly as well as placement of the control mechanism on the handle of the wheelbarrow.

FIG. 4 is a left side elevation view of the preferred embodiment of the present invention depicting the drive assembly and the wheel assembly.

FIG. 6 is an enlarged sectional view taken generally along lines 6—6 of FIG. 3 depicting a chain engaging an output sprocket of the drive assembly.

FIG. 7 is an enlarged sectional view taken generally along lines 7—7 of FIG. 3 depicting a wheel, axle, axle housing, pin, and mounting mechanism of the wheel assembly secured to the handles of the wheelbarrow.

FIG. 8A is an enlarged detailed sectional view of the wheel assembly configured in the powered mode of transport illustrating the pin inserted into channels of the axle and axle housing to provide coordinated coaxial rotation of the axle, axle housing, and wheel.

FIG. 8B is an enlarged detailed sectional view of the wheel assembly configured in the non-powered mode of transport illustrating rotation of the axle housing independent of the rotation of the axle and wheel.

DETAILED DESCRIPTION OF THE INVENTION

The present invention will now be described more fully hereinafter with reference to the accompanying drawings, in which a preferred embodiment of the invention is shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

For ease of reference, the term "powered mode" and "non-powered mode" refers to the two modes of operation of the present invention. Specifically, the term powered mode refers to operation of the wheelbarrow when components of the wheel assembly engage the drive assembly while the engine is running. Stated differently, the running engine translates power from the drive assembly to the wheel assembly to thereby cause integrated coaxial rotation of the axle and axle housing. An operator would most likely use the powered mode of transport when hauling heavy articles in the pan of the wheelbarrow.

Alternatively, the term "non-powered" mode refers the operation of the invention while components of the wheel assembly are disengaged from the drive assembly. Stated differently, the engine does not translate power from the drive assembly to the wheel assembly in the non-powered mode. When the operator manually pushes the wheelbarrow, the resulting movement of the wheel causes the rotation of the axle independent of the axle housing. Nevertheless, it will be understood that the engine may be running or shut off during the non-powered mode.

It will be understood by those skilled in the art that as used herein the terms "operatively connected" and "in operative communication" refer to a condition of the invention whereby gears, shafts, sprockets, chains, belts, or the like are linked to one another such that movement of one element affects movement of another element.

It will be further appreciated by those of ordinary skill in the art that, as used herein, the concept of a shaft or gear being "between" two other shafts or gears does not necessarily imply that the three shafts or gears are contiguous (i.e., in intimate contact). Rather, as used herein, the concept of one shaft being between two other shafts is meant to describe the relative positions of the shafts within the drive assembly structure, respectively.

Figure 1:
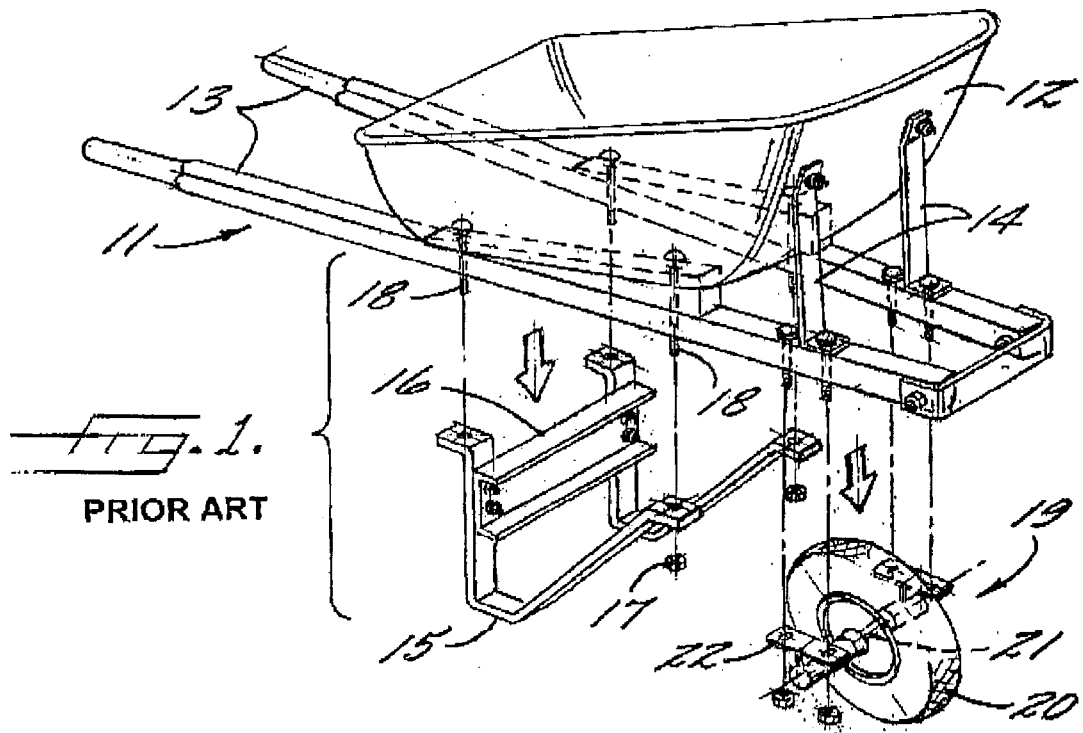
FIG. 1 is an exploded perspective view of a standard wheelbarrow from the prior art having a pan, handles, support members, and wheel assembly depicting the removal of the support members and wheel assembly for retrofit of the powered wheel assembly.
Figure 2:
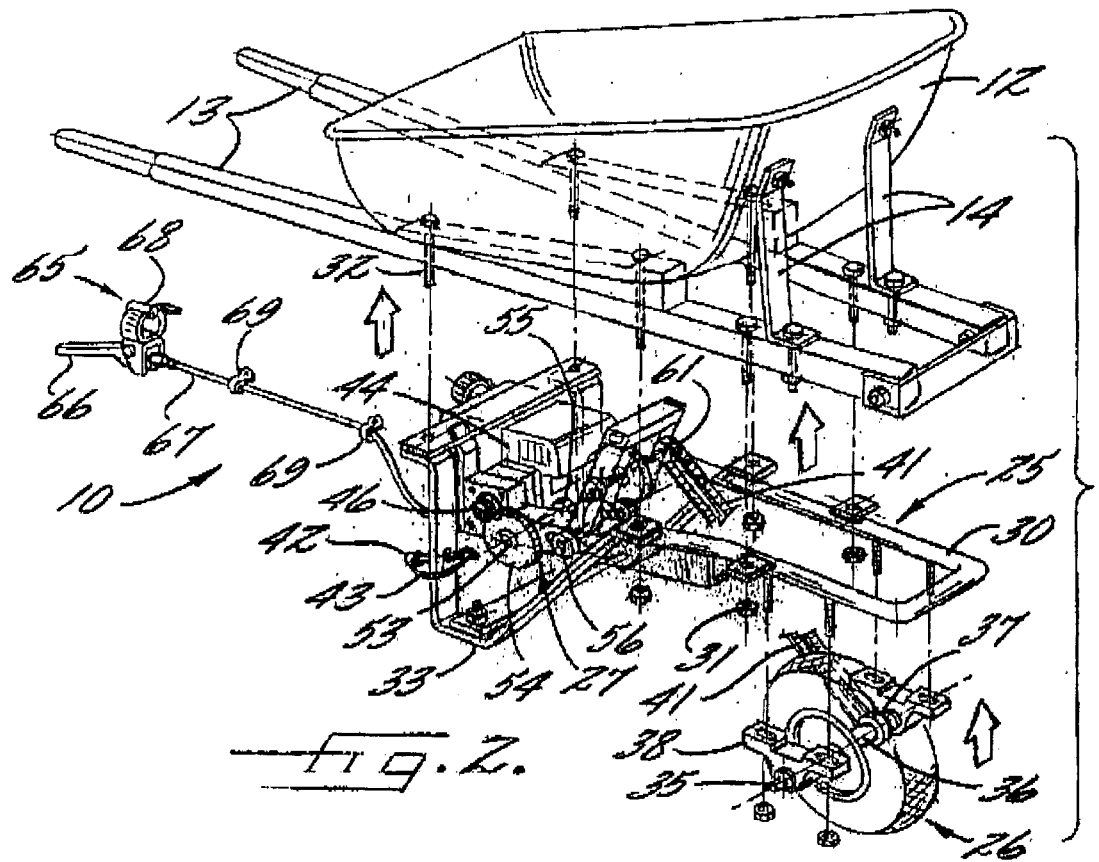
FIG. 2 is an exploded perspective view of a preferred embodiment of the powered wheel assembly depicting retrofit of a frame assembly, wheel assembly, drive assembly, and control mechanism to the standard wheelbarrow.

An overall view of the powered wheel assembly 10 that incorporates features of the present invention is set forth in FIG. 2. As depicted in FIGS. 1 and 2, the powered wheel assembly 10 can be retrofit to an existing wheelbarrow 11 having a pan 12, handles 13, pan braces 14, legs 15 connected by a leg brace 16, connectors 17, 18 (e.g., nuts and bolts) and a wheel assembly 19 having a wheel 20, an axle 21, and an axle bracket 22. In order to retrofit the powered wheel assembly 10 on the existing wheelbarrow 11, an operator unscrews the nuts 17 from the bolts 18 and then removes the legs 15 and wheel assembly 19 from the existing wheelbarrow 11. As shown in FIG. 2, an operator can mount the powered wheel assembly 10 to the handles 13 and pan 12 of the existing wheelbarrow 11. Advantageously, the powered wheel assembly 10 may utilize the connectors 17, 18 of the existing wheelbarrow 11.

A preferred embodiment of the powered wheel assembly 10 shown in FIG. 2 includes a frame assembly 25, a wheel assembly 26, and a drive assembly 27. The frame assembly 25 supports the wheel assembly 26 and drive assembly 27. As discussed herein, the construction of the wheel assembly 26 and its component parts permits the operator to selectively move the wheelbarrow in a powered and non-powered mode of transport. For example, during the powered mode of transport, the drive assembly 27 engages the wheel assembly 26 to move the wheelbarrow. Alternatively, during the non-powered mode of transport, the wheel assembly 26 is disengaged from the drive assembly 27, thereby minimizing friction inherent with the gearing of the drive assembly and permitting a wheel 34 of the wheel assembly to freely rotate about an axle 35. Thus, the operator is able to push the wheelbarrow, manually without having to overcome frictional forces created by the drive assembly 27.

The frame assembly 25 attaches to an underside portion of the wheelbarrow 11, and in particular, to underside portions of the handles 13 and pan 12. The frame assembly 25 includes a frame 30, connectors 31, 32 and at least one support member 33. As arranged, the frame 30 secures the wheel assembly 26 and drive assembly 27 to the wheelbarrow 11. In a preferred embodiment, the connectors 31, 32 may include nuts and bolts to secure the frame 30 to the handles 13 and pan 12 of the wheelbarrow 11. Nevertheless, the connectors 31, 32 may include any number of fasteners that are sufficient to secure the frame 30 to the wheelbarrow 11. As depicted in the preferred embodiment of FIGS. 2, 3, and 4, the support members 33 may include two downwardly projecting legs secured to the frame 30. The support members 33 are arranged to maintain the wheelbarrow 11 in a stationary position. As illustrated in the preferred embodiment of FIGS. 3 and 4, the support members 33 are substantially U-shaped. Nevertheless, it will be understood that the support members 33 are not limited to a U shape and may be, for example, V-shaped, rectangular, oval, semicircular, or elliptical.

The wheel assembly 26 includes at least one wheel 34, an axle 35 around which the wheel rotates, an axle housing 36 for supporting the axle, a front wheel drive device 37 secured to the axle housing, and a mounting mechanism 38 for securing the axle housing to the frame 30. The axle 35 includes a channel 39 that extends transversely through the rotational axis of the axle. The axle housing 36 also includes a channel 40 that extends transversely through the rotational axis of the axle 34. As depicted in FIGS. 7 and 8a and discussed further herein, the axle housing channel 40 and the axle channel 39 are capable of alignment with respect to each other.

The front wheel drive device 37 is capable of engaging a flexible linkage 41 provided in the drive assembly 27. The flexible linkage 41 may include a chain as depicted in FIGS. 2–7. The flexible linkage 41 may also include a belt (not shown). In a preferred embodiment of the invention that includes a final drive incorporating a chain, the front wheel drive device 37 is a sprocket that engages the chain (see FIGS. 5 and 6). In an alternative embodiment that includes a final drive 51 incorporating a belt, the front wheel drive device 37 is a pulley that engages the belt.

The axle mounting mechanism 38 may include any number of devices arranged to secure the axle housing 36 to the frame 30 of the wheelbarrow 11. In a preferred embodiment illustrated in FIGS. 7, 8a, and 8b, the axle mounting mechanism 38 includes a pair of collar brackets secured to an underside portion of the wheelbarrow handles 13. The collar brackets are arranged to support the axle housing 36 such that the axle housing is capable of coaxial rotation with respect to the axle 35. The collar brackets each have openings that are substantially aligned with the rotational axis of the axle 35 and the axle housing 36. The collar brackets axe arranged to receive the axle 35 and axle housing 36.

Advantageously, the axle 35 and axle housing 36 are capable of integrated coaxial rotation in the powered mode of transport (see FIG. 8a). Further, the axle 35 is capable of rotation independent of the axle housing 36 in the non-powered mode of transport (see FIG. 5b).

As shown in FIGS. 7 and 8a, a pin 42 inserted into the axle channel 39 and axle housing channel 40 provides the integrated coaxial rotation of the axle 35 and axle housing 36. As used in the powered mode of transport, the pin 42 operatively connects the 3 axle 5 and axle housing 36 to a flexible linkage 41 (e.g., chain or belt) of the drive assembly 27 (see FIG. 7). Specifically, the drive assembly 27 engages the front wheel drive device 37 secured to the axle housing 36 to thereby promote integrated coaxial rotation of the axle 35 and axle housing. With reference to FIG. 7, the invention provides a safety wire 43 connectable to each end of the pin 42 to detachably secure the pinto the axle housing 36 when configured in the powered made of transport.

Alternatively, an operator can remove the pin 42 from the axle channel 39 and axle housing channel 40 for operation in the non-powered mode of transport. In this configuration as illustrated in FIG. 8, the axle housing 36 and axle 35 are capable of rotation independent from one another. Further, the operator can secure the pin 42 to the frame 30 of the invention when configured in the non-powered mode as illustrated in FIG. 3.

Figure 5:
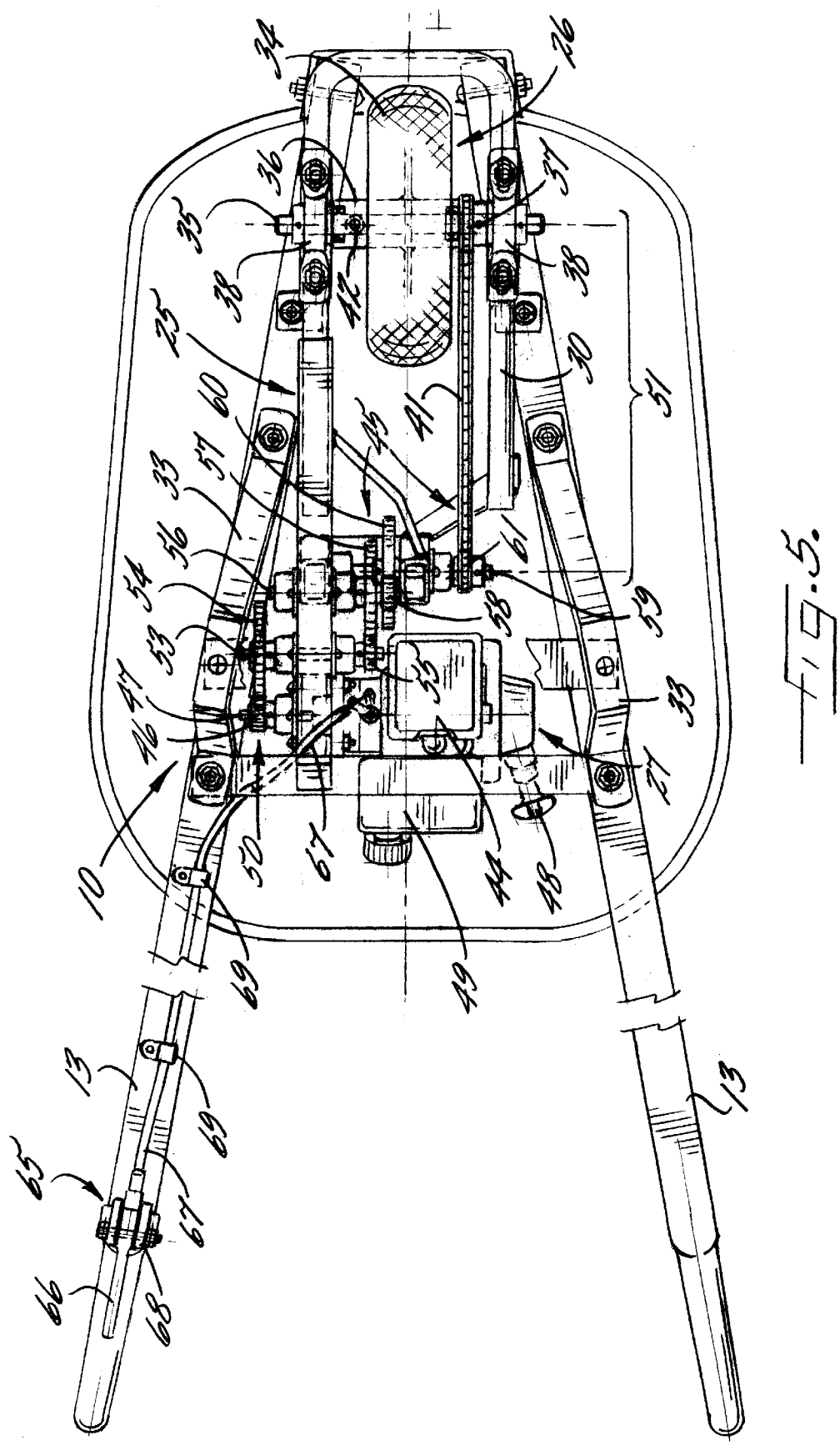
FIG. 5 is a bottom plan view taken generally along lines 5—5 on FIG. 3 illustrating the arrangement of the gears and shafts of the drive assembly with respect to an axle and axle housing of the wheel assembly.

With reference to FIG. 5, the drive assembly 27 includes an engine 44 and a transmission 45, wherein the transmission is positioned between and operatively connects the engine and the wheel assembly 26. The engine 44 includes a drive gear 46 secured to a drive shaft 47 that extends from the engine. In the preferred embodiment, the engine 44 is a two-stroke engine. It will be understood, however, that the engine 44 may include any engine having sufficient horsepower to move the wheelbarrow and its contents. For example, the engine 44 may have a displacement of twenty to fifty cubic centimeters (20 to 50 cc). As illustrated in FIGS. 3 and 4, a pull-starter 48 is provided to start the engine 44 and a fuel cell 49 is provided to store gasoline.

The transmission 45 includes a primary gear drive 50, a final drive 51 that incorporates a flexible linkage 40 such as a chain (see FIGS. 2–7) or belt (not shown), and a clutch 52 for engaging the primary gear drive. The preferred clutch 52 is a centrifugal clutch of the kind found in most powered yard equipment. With reference to the flexible linkage 41 (e.g., chain) of the final drive 51 shown in FIGS. 5 and 7, the chain engages the primary gear drive 50 and the front wheel drive device 37 of the wheel assembly 26. As noted above, the front wheel drive device 37 may include a sprocket or pulley. In the preferred embodiment, the front wheel drive device 37 is a sprocket. Thus, the chain is capable of engaging any other sprocket provided, for example, in the primary gear drive 50 and the sprocket of the front wheel drive device 37. Accordingly, the final drive 51 is capable of translating power from the engine 44 to the wheel assembly 26.

Referring to FIG. 5, the primary gear drive 50 is comprised of a series of gears and shafts. Specifically, the primary gear drive 50 includes a first intermediate shaft 53 having a first input gear 54 and a first output gear 55, a second intermediate shaft 56 having a second input gear 57 and a second output gear 58, and a third intermediate shaft 59 having a third input gear 60 and an output drive device 61. The first intermediate shaft 53 is positioned adjacent the drive shaft 47. Stated differently, the first intermediate shaft 53 is positioned between the drive shaft 47 and the second intermediate shaft 56. The first input gear 54 and first output gear 55 are secured to opposing ends of the first intermediate shaft 53 such that the first input gear 54 engages the drive gear 46 of the engine 44.

The second intermediate shaft 56 is positioned adjacent the first intermediate shaft 53, or, in between the first intermediate shaft 53 and the third intermediate shaft 59. The second input gear 57 and second output gear 58 are secured to opposing ends of the second intermediate shaft 56 such that the second input gear 57 engages the first output gear 55 of the first intermediate shaft 53.

The third intermediate shaft 59 is positioned adjacent the second intermediate shaft 56, or, in between the second intermediate shaft and the axle 35. The third input gear 60 and output drive device 61 are secured to opposing ends of the third intermediate shaft 59. Specifically, the third input gear 60 engages the second output gear 58 and the output drive device 61 engages the flexible linkage 40 (i.e., chain or belt) of the jinni drive 51 (see FIG. 7). It the preferred embodiment of the invention having a final chain drive, the output drive device 61 is a sprocket. Nevertheless, in an alternative embodiment of the invention having a final belt drive, the output drive device 61 may include a pulley.

Thus, in the preferred embodiment where the final drive 51 is chain driven, the output drive device 61 is a sprocket and the flexible linkage 40 is a chain (see FIGS. 2–7).

In another preferred embodiment where the final drive 51 is belt driven, the output drive device 61 is a pulley and the flexible linkage 41 is a belt (not shown).

Stated differently in operational terms, the chain or belt of the final drive 51 engages the sprocket or pulley of the output drive device 61 and the sprocket or pulley of the front wheel drive device 35, respectively.

The powered wheel assembly 10 may also include a throttle mechanism 65 that is detachably fitted to one of the handles 13 of the wheelbarrow 11. In particular, the throttle mechanism 65 translates operator input to the engine 44 and drive assembly 27. The throttle mechanism 65 comprises an actuator 66 for selectively powering the engine 44, a cable 67 positioned intermediate the actuator 66 and the engine 44, and a mounting mechanism 68 for securing the actuator to one of the handles 13 of the wheelbarrow. In the preferred embodiment depicted in FIGS. 2 and 3, the actuator 66 is a lever, but may also include a twist grip or a push button mechanism. The cable 67 transmits operator input from the actuator 66 to the engine 44. The cable 67 is secured to the one of the handles 13 of the wheelbarrow 11 by cable clamps 69. The actuator mounting mechanism 68 may include a bracket or a clamp.

In use, the preferred embodiment of powered wheel assembly 10 permits the operator to select whether to operate the wheelbarrow in the powered or non-powered mode of transport by placement of the pin 42. Specifically, if choosing the powered mode of transport, the operator aligns the axle channel 39 and axle housing channel 40 by pressing down on the handles 13 to lift the wheel 34 off the ground and then rotate the wheel until the axle channel and axle housing channel are aligned. Upon alignment of the channels 39, 40, the operator inserts the pin 42 into the channels and secures the pin to the axle housing 36 with the safety wire 43. Next, the operator can start the engine 44 with the pull starter 48 and selectively drive the wheelbarrow 11 with the assistance of the drive assembly 27.

Specifically, the operator squeezes the actuator 66 that causes the clutch 52 to engage the drive shaft 47 of the engine 44. The drive shaft 47 causes rotation of the drive gear 46 attached thereto. The drive gear 46 engages the first input gear 54 of the first intermediate shaft 53. Rotation of the first input gear 54 causes rotation of the first intermediate shaft 53 and the first output gear 55 attached thereto. The first output gear 55 engages the second input gear 57 secured to the second intermediate shaft 56. Rotation of the second input gear 57 causes rotation of the second intermediate shaft 56 and the second output gear 58 attached thereto. The second output gear 58 engages the third input gear 60 of the third intermediate shaft 59. Rotation of the third input gear 60 causes rotation of the third intermediate shaft 59 and the output drive device 61 attached thereto. In the preferred embodiment, the output drive device 61 is a sprocket that engages the flexible linkage 41, or chain in this instance. The flexible linkage 41, preferably a chain, engages the front wheel drive device 37, preferably, a sprocket that is secured to the housing 36. The rotation of the output drive sprocket 61 moves the chain 41 that translates from the drive assembly 27 to the front wheel drive device 37, preferably a sprocket, of the wheel assembly 26. Rotation of the front wheel drive device 37 causes rotation of the axle housing 36. In the powered mode of transport, the pin 42 that is inserted into the axle housing channel 40 and the axle channel 39 connects the axle housing 36 and axle 35. Accordingly, rotation of the axle housing 36 causes rotation of the axle 35 and the wheel 34 attached thereto. Rotation of the wheel 34 advances the wheelbarrow 11 along a forward path of travel.

If choosing the non-powered mode of transport, the operator can remove the pin 42 from the axle channel 39 and a axle housing channel 40 and secure the pin to the frame 30 with the safety wire 43. As configured in the non-powered mode, the wheel 34 rotates independently of the gears 45, 54, 55, 57, 58, 60, shafts 46, 53, 56, 59, and flexible linkage 41 of the drive assembly 27. Thus, the operator may manually move the wheelbarrow 11 as the wheel 34 freely rotates about the axle 35 without resistance caused by the frictional forces inherent with the drive assembly 27 (i.e., chain and gears). Advantageously, the non-powered mode is suitable for moving the wheelbarrow, if the engine 44 runs out of gas.

In the drawings and specification, there have been disclosed typical embodiments on the invention and, although specific terms have been employed, they have been used in a generic and descriptive sense only and not for purposes of limitation, the scope of the invention being set forth in the following claims.

That which is claimed is:

1. A powered wheel assembly for retrofit to a wheelbarrow, said powered wheel assembly comprising:
   a frame assembly that is attachable to an underside portion of a wheelbarrow having a pan and handles;
   a wheel assembly secured to said frame assembly, said wheel assembly comprising at least one wheel an axle around which said wheel rotates, and an axle housing for supporting said axle; and
   a drive assembly secured to said frame assembly, said drive assembly in operative communication with said wheel assembly;
   wherein said axle having a channel that extends transversely through the rotational axis of said axle;
   wherein said axle housing having a channel that extends transversely trough the rotational axis of said axles said axle housing channel capable of alignment with respect to said axle channel;
   wherein said wheel assembly is configured to permit an operator to selectively move the wheelbarrow in a powered and non-powered mode of transport.

2. A powered wheel assembly according to claim 1, wherein said frame assembly comprises:
   a frame arranged to support said wheel assembly and said drive assembly;
   connectors for detachably securing said frame to the underside portion of the wheel barrow;
   and at least one support member secured to said frame, said at least one support member arranged to maintain the wheel barrow in a stationary position.

3. A powered wheel assembly according to claim 1, wherein said wheel assembly further comprises:
   a front wheel drive device secured to said axle housing, said front wheel drive device capable of engaging a flexible linkage; and
   a mounting mechanism for securing said axle housing to said frame assembly such that said housing is capable of coaxial rotation with respect to said axle;
   wherein said axle and said axle housing are capable of integrated coaxial rotation in the powered mode of transport;
   wherein said axle is capable of rotation independent of said axle housing in the non-powered mode of transport.

4. A powered wheel assembly according to claim 3, wherein said mounting mechanism comprises:
   a pair of collar brackets arranged to support said axle housing, said pair of brackets each having openings that are substantially aligned with the rotational axis of said axle and said axle housing.

5. A powered wheel assembly according to claim 3, wherein:
said integrated coaxial rotation is provided by a pin inserted into said axle channel and said axle housing channel, said pin operatively connecting said axle and said axle housing in the powered made.

6. A powered wheel assembly according to claim 1, wherein said drive assembly comprises:
an engine having a drive shaft and a drive gear, said drive gear secured to said drive shaft; and
a transmission positioned intermediate said engine and said wheel assembly, said transmission arranged to operatively connect said engine and said wheel assembly.

7. A powered wheel assembly according to claim 6, wherein said transmission comprises:
a primary gear drive;
a final drive having a flexible linkage that operatively engages said primary gear drive and said wheel assembly, said final drive capable of translating power from said engine to said wheel assembly; and
a clutch for engaging said primary gear drive.

8. A powered wheel assembly according to claim 7, wherein said primary gear drive comprises:
a first intermediate shaft adjacent said drive shaft;
a first input gear and a first output gear secured to opposing ends of said first intermediate shaft, said first input gear engaged with said drive gear of said engine;
a second intermediate shall adjacent said first intermediate shaft;
a second input gear and a second output gear secured to opposing ends of said second intermediate shaft, said second input gear engaged with said first output gear;
a third intermediate shall adjacent said second intermediate shaft; and a third input gear and an output drive device secured to opposing ends of said third intermediate shaft, said third input gear engaged with said second output gear;
wherein said flexible linkage engages said output drive device and said wheel assembly.

9. A powered wheel assembly according to claim 8, wherein said output drive device is a sprocket and said flexible linkage is a chain.

10. A powered wheel assembly according to claim 8, wherein said output drive device is a pulley and said flexible linkage is a belt.

11. A powered wheel assembly according to claim 1, further comprising;
a throttle mechanism in communication with said drive assembly said throttle mechanism capable of translating operator input to said drive assembly in the powered mode of transport to thereby advance the wheelbarrow, said throttle mechanism detachably fitted to one of the bandies of the wheelbarrow.

12. A powered wheel assembly according to claim 11, wherein said throttle mechanism comprises:
an actuator for selectively powering said drive assembly;
a cable positioned intermediate said actuator and said drive assembly, said cable in communication with said actuator and said drive assembly; and
a mounting mechanism for detachably fitting said actuator to one of the handles of the wheel barrow.

13. A powered wheel assembly according to claim 12, wherein said actuator includes a lever.

14. A powered wheel assembly according to claim 12, wherein said actuator includes a twist grip.

15. A powered wheel assembly according to claim 12, wherein said actuator includes a push button mechanism.

16. A powered wheel assembly according to claim 12, wherein said actuator mounting mechanism includes bracket.

17. A powered wheel assembly according to claim 12, wherein said actuator mounting mechanism includes a clamp.

18. A powered wheel assembly for retrofit to a wheelbarrow, said powered wheel assembly comprising:
a frame assembly that is attachable to an underside portion of a wheelbarrow having a pan and handles;
a wheel;
an axle around which said wheel rotates, said axle having a channel that extends transversely through die rotational axis of said axle;
an axle housing for supporting said axle said axle housing mounted to said frame assembly such that said axle housing is capable of coaxial rotation with respect to said axle, said axle housing having a channel that extends transversely through the rotational axis of said axle, said axle housing channel capable of alignment with said axle channel;
a front wheel drive sprocket secured to said axle housing, said front wheel drive sprocket capable of engaging a chain; and
a drive assembly secured to said frame assembly, said drive assembly in operative communication with said front wheel drive sprocket;
wherein said axle and said axle housing are capable of integrated coaxial rotation in a powered mode of transport;
wherein said axle is capable of rotation independent of said axle housing in a non-powered mode of transport.

19. A powered wheel assembly according to claim 18, further comprising:
a pair of collar brackets for mounting said axle housing on said frame assembly, said pair of brackets each having openings that are substantially aligned with the rotational axis of said axle and said axle housing.

20. A powered wheel assembly according to claim 18, further comprising:
a lever for selectively powering said drive assembly, said lever capable of translating operator input to said drive assembly in the powered mode of transport to thereby advance the wheelbarrow, said lever detachably fitted to one of the handles of the wheelbarrow;
a cable positioned intermediate said lever and said drive assembly, said cable in operative communication with said lever and said drive assembly; and
a mounting bracket for detachably fitting said actuator to one of the bandies of the wheel barrow.

21. A powered wheel assembly according to claim 20, further comprising a plurality of cable clamps that secure said cable to one of the bandies to the wheelbarrow.

22. A powered wheel assembly according to claim 18, further comprising a pin inserted into said axle channel and said axle housing channel, said pin operatively connecting said axle and said axle housing in the powered mode of transport.

23. A powered wheel assembly according to claim 22, wherein said pin is detachably secured in said axle channel and said axle housing channel by a safety wire in the powered mode of transport.

24. A powered wheel assembly according to claim 22, wherein said pin is detachably secured to said frame assembly by a safety wire in the non-powered mode of transport.

25. A powered wheel assembly according to claim 18, wherein said frame assembly comprises:
   a frame arranged to support said wheel assembly and said drive assembly;
   connectors for detachably securing said frame to the handles and pan of the wheel barrow; and
   a pair of legs secured to said frame, said pair of legs arranged to maintain the wheel barrow in a stationary position.

26. A powered wheel assembly according to claim 25, wherein said pair of legs is substantially U-shaped.

27. A powered wheel assembly according to claim 25, wherein said pair of legs is substantially V-shaped.

28. A powered wheel assembly according to claim 18, wherein said drive assembly comprises:
   an engine having a drive shaft and a drive gear, said drive gear secured to said drive shaft; and
   a transmission positioned intermediate said engine and said wheel assembly, said transmission arranged to operatively connect said engine and said wheel assembly.

29. A powered wheel assembly according to claim 28 wherein said transmission comprises:
   a primary gear drive;
   a final chain drive having a chain that operatively engages said primary gear drive and said front wheel drive sprocket, said chain capable of translating power from said engine to said wheel assembly; and
   a clutch for engaging said primary gear drive.

30. A powered wheel assembly according to claim 29, wherein said primary gear comprises:
   a first intermediate shaft adjacent said drive shaft;
   a first input gear and a first output gear secured to opposing ends of said first intermediate shaft, said first input gear engaged with said drive gear of said engine;
   a second intermediate shaft adjacent said first intermediate shaft;
   a second input gear and a second output gear secured to opposing ends of said second intermediate shaft, said second input gear engaged with said first output gear;
   a third intermediate shaft adjacent said second intermediate shaft; and
   a third input gear and an output sprocket secured to opposing ends of said third intermediate shaft, said third input gear engaged with said second output gear;
   wherein said chain engages said output sprocket and front wheel chive sprocket to thereby link said engine to said axle housing.

31. A motorized wheelbarrow for transporting articles, said motorized wheelbarrow comprising:
   a wheelbarrow having a pan and a pair handles;
   a frame assembly secured to an underside portion of said wheelbarrow;
   a wheel assembly secured to said frame assembly; and
   a drive assembly secured to said frame assembly, said drive assembly in operative communication with said wheel assembly, said drive assembly comprising
      an engine having a drive shaft and a drive gear, said drive gear secured to said drive shaft; and
      a transmission positioned intermediate said engine and said wheel assembly, said transmission arranged to operatively connect said engine and said wheel assembly, said transmission comprising a primary gear drive and a final drive,
   said primary gear drive having
      a first intermediate shaft adjacent said drive shaft;
      a first input gear and a first output gear secured to opposing ends of said first intermediate shaft said first input gear engaged with said drive gear of said engine;
      a second intermediate shaft adjacent said first intermediate shaft;
      a second gear and a second output gear secured to opposing ends of said second intermediate shaft, said second input gear engaged with said first output gear;
      a third intermediate shaft adjacent said second intermediate shaft; and
      a third input gear and an output drive device secured to opposing ends of said third intermediate shaft, said third input gear engaged with said second output gear;
   said final drive having a flexible linkage that operatively said primary gear drive and said wheel assembly, said final drive capable of translating power from said engine to said wheel assembly;
   wherein said flexible linkage engages said output device and said, wheel assembly;
   wherein said wheel assembly is configured to permit an operator to selectively move said wheelbarrow in a powered and non-powered mode of transport.

32. A powered wheel assembly according to claim 31, wherein said frame assembly comprises:
   a frame arranged to support said wheel assembly and said drive assembly;
   connectors for detachably securing said frame to said wheelbarrow;
   and at least one support member secured to said frame, said at least one support member ranged to maintain said wheel barrow in a stationary position.

33. A powered wheel assembly according to claim 31, wherein said wheel assembly comprises:
   at least one wheel;
   an axle which said wheel rotates, said axle having a channel that extends transversely through the rotational axis of said axle;
   an axle housing for supporting said axle, said axle housing having a channel that extends transversely through the rotational axis of said axle, said axle housing channel capable of alignment with respect to said axle channel;
   a front wheel drive device secured to said axle housing, said front wheel drive device capable of engaging a flexible linkage; and
   a mounting mechanism for securing said axle housing to said frame assembly such that said axle housing is capable of coaxial rotation with respect to said axle;
   wherein said axle and said axle housing are capable of integrated coaxial rotation in the powered mode of transport;
   wherein said axle is capable of rotation independent of said axle housing in the non-powered mode of transport.

34. A powered wheel assembly according to claim 33, wherein said mounting mechanism comprises a pair of collar brackets arranged to support said axle housing, said pair of brackets each having openings that are substantially aligned with the rotational axis of said axle and said axle housing.

35. A powered wheel assembly according to claim 34, wherein said integrated coaxial rotation is provided by a pin inserted into said axle channel and said axle housing channel, said pin operatively connecting said axle and said axle housing in the powered mode.

36. A powered wheel assembly according to claim 31, wherein said transmission further comprises
a clutch for engaging said primary gear drive.

37. A powered wheel assembly according to claim 31, wherein said output drive device is a sprocket and said flexible linkage is a chain.

38. A powered wheel assembly according to claim 31, wherein said output drive device is a pulley and said flexible linkage is a belt.

39. A powered wheel assembly according to claim 31, further comprising:
a throttle mechanism in communication with said drive assembly, said throttle mechanism capable of translating operator input to said drive assembly in the powered mode of transport to thereby advance said wheelbarrow, said throttle mechanism detachably fitted to one of said handles of said wheelbarrow.

40. A powered wheel assembly according to claim 39, wherein said throttle mechanism comprises:
an actuator for selectively powering said drive assembly;
a cable positioned intermediate said actuator and said drive assembly, said cable in communication with said actuator and said drive assembly and
a mounting mechanism for detachably fitting said actuator to one of the bandies of the wheel barrow.

41. A powered wheel assembly according to claim 40, wherein said actuator includes a lever.

42. A powered wheel assembly according to claim 40, wherein said actuator includes a twist grip.

43. A powered wheel assembly according to claim 40, wherein said actuator includes a push button mechanism.

44. A powered wheel assembly according to claim 40, wherein said actuator mounting mechanism includes a bracket.

45. A powered wheel assembly according to claim 40, wherein said actuator mounting mechanism includes a clamp.

* * * * *

UNITED STATES PATENT AND TRADEMARK OFFICE
CERTIFICATE OF CORRECTION

PATENT NO. : 6,745,859 B2
DATED : June 8, 2004
INVENTOR(S) : Simons et al.

It is certified that error appears in the above-identified patent and that said Letters Patent is hereby corrected as shown below:

Title page,
Item [57], ABSTRACT,
Line 4, the first occurrence of "and" should read -- an --.

Column 1,
Line 33, "axel" should read -- axle --.

Column 3,
Line 47, "case" should read -- ease --.

Column 5,
Line 40, "axe" should read -- are --.
Line 46, "5b" should read -- 8b --.
Line 51, "3 axle 5" should read -- axle 35 --.
Line 58, "pinto" should read -- pin to --.

Column 6,
Line 59, "jinni" should read -- final --.
Line 59, "it" should read -- in --.

Line 7,
Line 57, "the housing 36" should read -- the axle housing 36 --.
Line 58, "that translates from" should read -- that translates motion from --.

Column 8,
Line 3, "a" should be deleted from the beginning of the line.
Line 25, "at least one wheel" should read -- at least one wheel, --.
Line 34, "trough" should read -- through --.
Line 34, "said axles" should read -- said axle, --.
Lines 45 and 48, "wheeel barrow" should read -- wheelbarrow --.
Line 55, "that said housing" should read -- that said axle housing --.

Column 9,
Lines 31 and 36, "shall" should read -- shaft --.
Line 56, "bandies" should read -- handles --.
Line 64, "wheel barrow" should read --wheelbarrow --.

UNITED STATES PATENT AND TRADEMARK OFFICE
CERTIFICATE OF CORRECTION

PATENT NO. : 6,745,859 B2
DATED : June 8, 2004
INVENTOR(S) : Simons et al.

It is certified that error appears in the above-identified patent and that said Letters Patent is hereby corrected as shown below:

Column 10,
Lines 8 & 9, "includes bracket" should read -- includes a bracket --.
Line 19, "through die" should read -- through the --.
Line 21, a comma should be between the first and second occurrence of "said axle".
Lines 56 & 59, "bandies" should read -- handles --.
Line 56, "wheel barrow" should read -- wheelbarrow --.

Column 11,
Lines 11 and 13, "wheel barrow" should read -- wheelbarrow --.
Line 52, "chive" should read -- drive --.

Column 12,
Line 9, "intermediate shaft said" should read -- intermediate shaft, said --.
Lines 24 & 25, "that operatively said" should read -- that operatively engages said --.
Line 28, "said output device'" should read -- said output drive device --.
Line 29, the "," after said should be deleted.
Line 40, "ranged" should read -- arranged --.
Line 41, "wheel barrow" should read -- wheelbarrow --.
Line 45, "an axle which" should read -- an axle around which --.

Column 14,
Line 8, "drive assembly and" should read -- drive assembly; and --.
Line 10, "bandies" should read -- handles --.
Line 10, "wheel barrow" should read -- wheelbarrow --.

Signed and Sealed this

Tenth Day of August, 2004

JON W. DUDAS
*Acting Director of the United States Patent and Trademark Office*

UNITED STATES PATENT AND TRADEMARK OFFICE
CERTIFICATE OF CORRECTION

PATENT NO.   : 6,745,859 B2
DATED        : June 8, 2004
INVENTOR(S)  : Simons et al.

It is certified that error appears in the above-identified patent and that said Letters Patent is hereby corrected as shown below:

Title page,
Item [57], ABSTRACT,
The first occurrence of "and" should read -- an --.

Column 1,
Line 33, "axel" should read -- axle --.

Column 3,
Line 47, "case" should read -- ease --.

Column 5,
Line 40, "axe" should read -- are --.
Line 46, "5b" should read -- 8b --.
Line 51, "3 axle 5" should read -- axle 35 --.
Line 58, "pinto" should read -- pin to --.

Column 6,
Line 59, "jinni" should read -- final --.
Line 59, "it" should read -- In --.

Column 7,
Line 57, "the housing 36" should read -- the axle housing 36 --.
Line 58, "that translates from" should read -- that translates motion from --.

Column 8,
Line 3, "a" should be deleted from the beginning of the line.
Line 25, "at least one wheel" should read -- at least one wheel, --.
Line 34, "trough" should read -- through --.
Line 34, "said axles" should read -- said axle, --.
Line 45, "wheel barrow" should read -- wheelbarrow --
Line 48, "wheel barrow" should read -- wheelbarrow --.
Line 55, "that said housing" should read -- that said axle housing --.

UNITED STATES PATENT AND TRADEMARK OFFICE
CERTIFICATE OF CORRECTION

PATENT NO. : 6,745,859 B2
DATED : June 8, 2004
INVENTOR(S) : Simons et al.

It is certified that error appears in the above-identified patent and that said Letters Patent is hereby corrected as shown below:

Column 9,
Line 31, "shall" should read -- shaft --.
Line 36, "shall" should read -- shaft --.
Line 56, "bandies" should read -- handles --.
Line 64, "wheel barrow" should read -- wheelbarrow --.

Column 10,
Lines 8 and 9, "includes bracket" should read -- includes a bracket --.
Line 19, "through die" should read -- through the --.
Line 21, a comma should be between the first and second occurrence of "said axle".
Line 56, "bandies" should read -- handles --.
Line 56, "wheel barrow" should read -- wheelbarrow --.
Line 59, "bandies" should read -- handles --.

Column 11,
Line 11, "wheel barrow" should read -- wheelbarrow --.
Line 13, "wheel barrow" should read -- wheelbarrow --.
Line 52, "chive" should read -- drive --.

Column 12,
Line 9, "intermediate shaft said" should read -- intermediate shaft, said --.
Lines 24 and 25, "that operatively said" should read -- that operatively engages said --.
Line 28, "said output device" should read -- said output drive device --.
Line 29, the "," after said should be deleted.
Line 40, "ranged" should read -- arranged --.
Line 41, "wheel barrow" should read -- wheelbarrow --.
Line 45, "an axle which" should read -- an axle around which --.

UNITED STATES PATENT AND TRADEMARK OFFICE
CERTIFICATE OF CORRECTION

PATENT NO. : 6,745,859 B2
DATED : June 8, 2004
INVENTOR(S) : Simons et al.

It is certified that error appears in the above-identified patent and that said Letters Patent is hereby corrected as shown below:

<u>Column 14,</u>
Line 8, "drive assembly and" should read -- drive assembly; and --.
Line 10, "bandies" should read -- handles --.
Line 10, "wheel barrow" should read -- wheelbarrow --.

Signed and Sealed this

Seventeenth Day of August, 2004

JON W. DUDAS
*Acting Director of the United States Patent and Trademark Office*